US012668140B2

(12) United States Patent
Aoki et al.

(10) Patent No.: US 12,668,140 B2
(45) Date of Patent: **\*Jun. 30, 2026**

(54) CHARGING INLET

(71) Applicant: Yazaki Corporation, Tokyo (JP)

(72) Inventors: Yusuke Aoki, Kakegawa (JP); Naoto Ikeya, Kakegawa (JP); Toru Yamada, Kakegawa (JP); Hidetaka Hondo, Sagamihara (JP)

(73) Assignee: YAZAKI CORPORATION, Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 18/516,526

(22) Filed: Nov. 21, 2023

(65) Prior Publication Data

US 2024/0174096 A1 May 30, 2024

(30) Foreign Application Priority Data

Nov. 30, 2022 (JP) ................................. 2022-192205

(51) Int. Cl.
H01R 13/52 (2006.01)
B60L 53/16 (2019.01)
H01R 13/504 (2006.01)

(52) U.S. Cl.
CPC .......... B60L 53/16 (2019.02); H01R 13/5045 (2013.01); H01R 13/5202 (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 7,618,287 B2 * | 11/2009 | Hass | .................... | H01R 13/521 |
| | | | | 439/589 |
| 10,693,254 B2 * | 6/2020 | Obata | .................. | H01R 13/443 |
| 10,998,663 B2 * | 5/2021 | Kondo | .............. | H01R 13/5216 |
| 2020/0153157 A1 | 5/2020 | Iwami et al. | | |
| 2024/0174095 A1 * | 5/2024 | Aoki | .................... | H01R 13/521 |

* cited by examiner

*Primary Examiner* — Tho D Ta
(74) *Attorney, Agent, or Firm* — Sughrue Mion, PLLC

(57) ABSTRACT

A charging inlet includes a plurality of terminals; a housing accommodating the terminals therein; and a terminal holder integrated to the housing. Each of the terminals includes: a first connected portion having a solid cylindrical shape; a second connected portion; and a middle portion. A rubber component and a flange made of a resin is disposed on an outer circumference of the middle portion. The rubber component includes: a cylindrical portion; and a plurality of ribs on an outer circumferential surface of the cylindrical portion, the ribs extending along an axial direction of the cylindrical portion. The housing has a press-fit hole in which the rubber component is press-fitted. The flange is clamped between the housing and the terminal holder outside the press-fit hole.

9 Claims, 10 Drawing Sheets

CHARGING INLET

BACKGROUND OF THE INVENTION

Technical Field

The present invention relates to a charging inlet.

Background Art

For example in an electric vehicle and hybrid vehicle, a vehicle body is equipped with a connector for charging a battery installed on the vehicle (see e.g. Patent Document 1). Such a connector is generally called "charging inlet". FIGS. 7 to 10 shows a charging inlet as an example for conventional charging inlets.

A charging inlet 501 as shown in FIGS. 7 to 9 is intended to be mated with a charging plug which is not shown. The charging inlet 501 includes a plurality of terminals 502, a housing 505 accommodating the terminals 502 therein, and a terminal holder 504 integrated to the housing 505.

The terminals 502 are shaped by means of cutting. As shown in FIGS. 8 and 10, each of the terminals 502 includes a first connected portion 521 formed in a solid cylindrical shape, a second connected portion 522, a middle portion 523 between the first connected portion 521 and the second connected portion 522, and a flange 526 formed in a ring shape around an outer circumference of the middle portion 523. The first connected portion 521 is intended to be mated with a terminal provided in the charging plug. The second connected portion 522 is a portion connected to an electric wire 503. The second connected portion 522 is formed in a cylindrical shape which is coaxial with the first connected portion 521, wherein the second connected portion 522 includes a recess 524 with the electric wire 503 inserted therein.

The housing 505 includes an inner housing 552 and hood section 551, wherein the inner housing 552 accommodates the plurality of terminals 502 therein. For each of the terminals 502, the inner housing 552 includes a first accommodating portion 553, a second accommodating portion 554 and a communication portion 556 formed therein.

The first accommodating portion 553 is configured as a space which is open toward a front side of the charging inlet 501, wherein the first accommodating portion 553 accommodates a front half of the first connected portion 521. The second accommodating portion 554 is configured as a space which is open toward a back side of the charging inlet 501, wherein the second accommodating portion 554 accommodates the middle portion 523, the flange 526 and the second connected portion 522. The communication portion 556 is configured as a space through which the first accommodating portion 553 is in communication with the second accommodating portion 554, wherein the communication portion 556 accommodates a back half of the first connected portion 521.

The terminal holder 504 is arranged such that the flange 526 is clamped between the terminal holder 504 and a deepest side 557 of the second accommodating portion 554 to prevent the terminals 502 from being removed out of the inner housing 552.

CITATION LIST

Patent Literature

Patent Document 1: JP 2020-77573 A

SUMMARY OF THE INVENTION

Since the charging inlet 501 as described above is configured such that the terminals 502 are fixed in the housing 505 by the terminal holder 504, the charging inlet 501 has the problem that it is not possible to adjust a radial position of the terminals 502 depending on terminal misalignment of the charging plug.

Therefore, an objective of the present invention is to provide a charging inlet which enables a radial position of a terminal to be adjusted within a housing depending on terminal misalignment of a charging plug.

According to the present invention, a charging inlet includes: a terminal; a housing accommodating the terminal therein; and a terminal holder integrated to the housing, wherein the terminal includes: a first connected portion having a solid cylindrical shape; a second connected portion disposed coaxially with the first connected portion; and a middle portion between the first connected portion and the second connected portion, wherein a rubber component and a flange made of a resin are disposed on an outer circumference of the middle portion, wherein the rubber component includes: a cylindrical portion; and a plurality of ribs on an outer circumferential surface of the cylindrical portion, the ribs extending along an axial direction of the cylindrical portion, wherein the flange is disposed adjacent to an end of the cylindrical portion facing the second connected portion and has a ring shape with a larger diameter than the cylindrical portion, wherein the housing has a press-fit hole in which the rubber component is press-fitted, and wherein the flange is clamped between the housing and the terminal holder outside the press-fit hole.

According to the present invention, a method of producing the charging inlet successively includes: a terminal shaping step of shaping the terminal by means of cutting; a rubber component molding step of molding the rubber component by means of insert molding in which the terminal is placed in a mold for producing the rubber component; a flange molding step of molding the flange by means of insert molding in which the terminal is placed in a mold for producing the flange; and a plating step of plating an exposed outer surface of the terminal except for portions of the terminal with the rubber component and the flange disposed thereon.

The present invention enables a radial position of a terminal to be adjusted within a housing depending on terminal misalignment of a charging plug.

DETAILED DESCRIPTION OF PREFERRED EMBODIMENTS

A "charging inlet" according to an embodiment of the present invention will be explained with reference to FIGS. 1 to 6.

Figure 1:
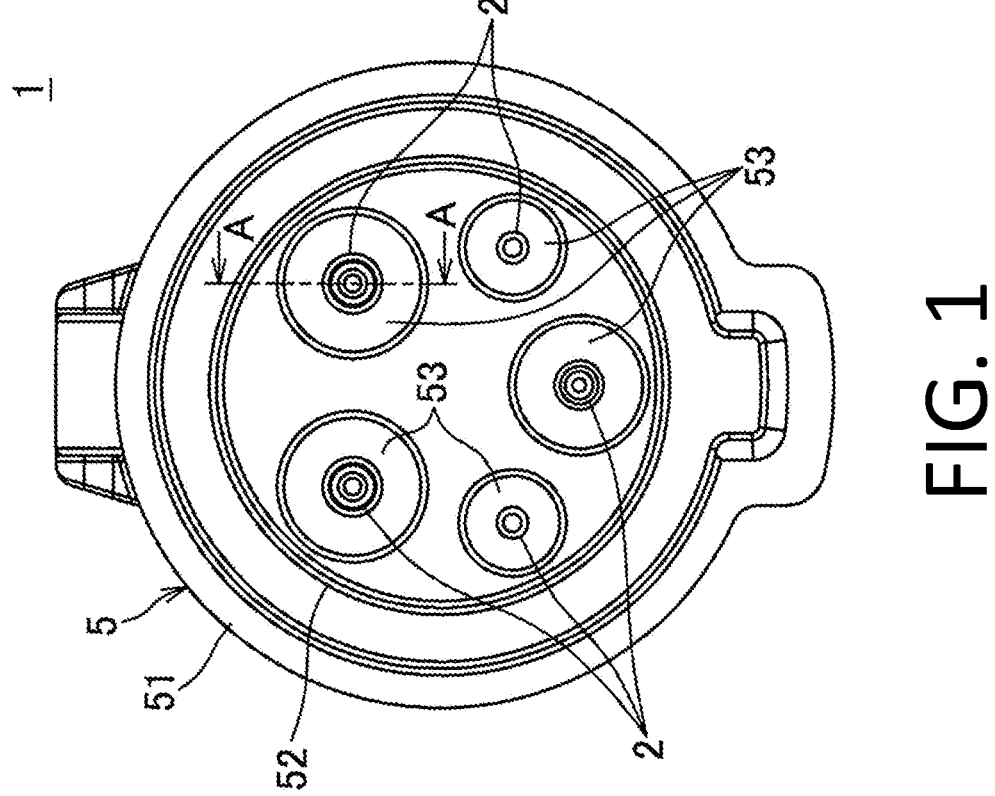
FIG. 1 shows a front view of a charging inlet according to an embodiment of the present invention.
Figure 2:
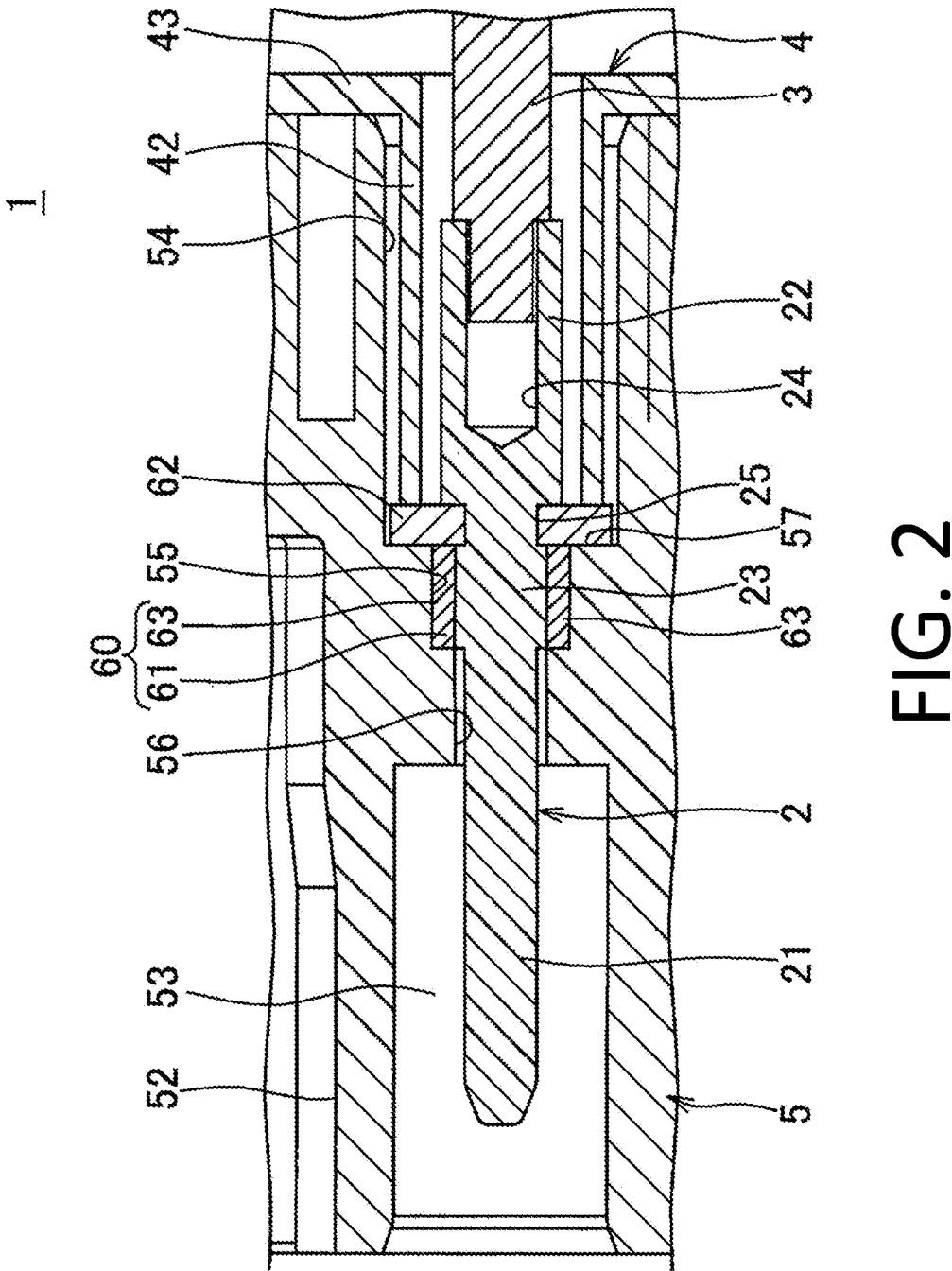
FIG. 2 shows a sectional view along the line A-A in FIG. 1.
Figure 3:
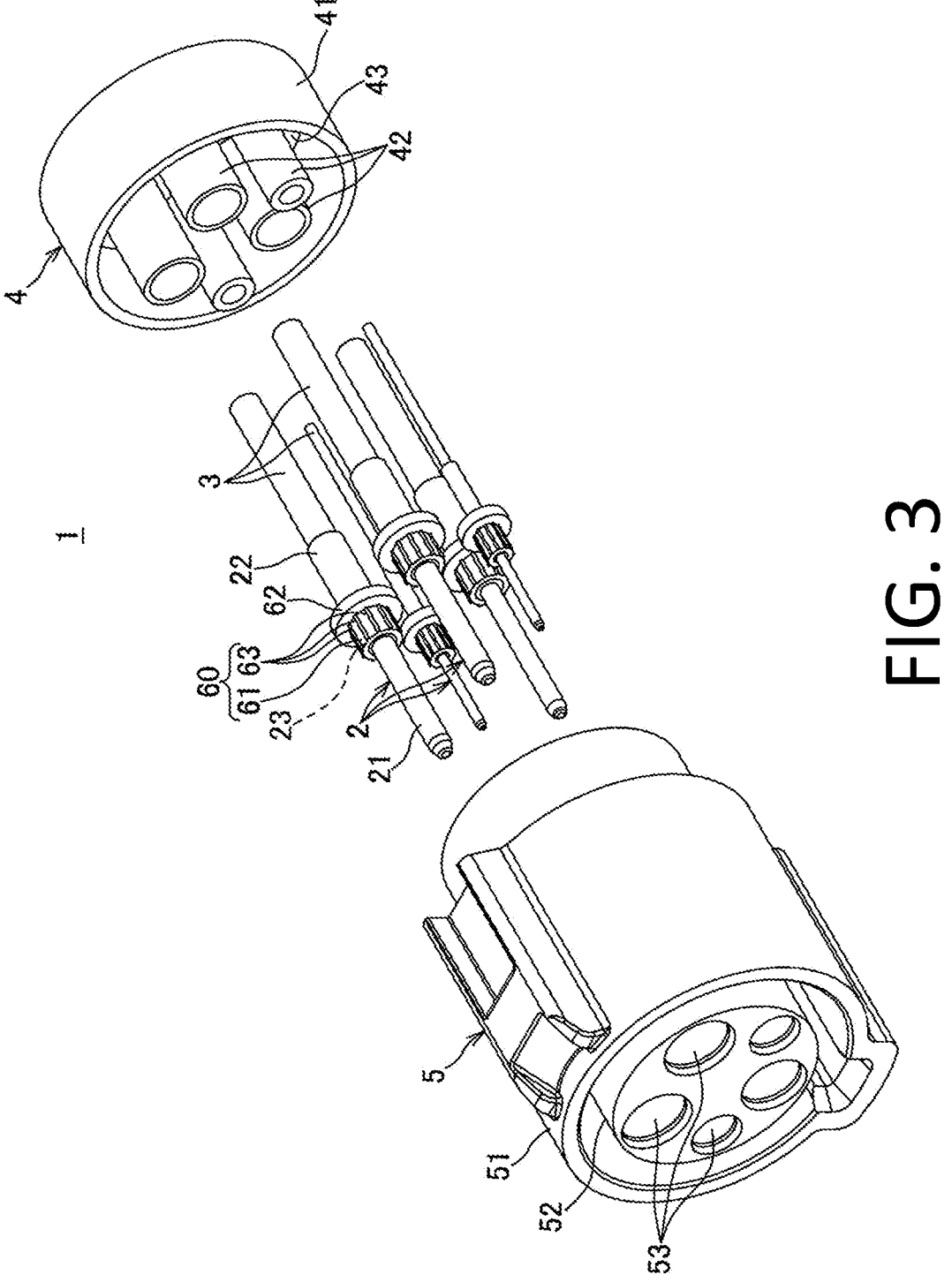
FIG. 3 shows an exploded view of the charging inlet according to FIG. 1.

A charging inlet 1 as shown in FIGS. 1 to 3 is installed to a vehicle body of e.g. an electric vehicle or a hybrid vehicle and configured to be mated with a charging plug which is not shown. The charging inlet 1 includes a plurality of terminals 2, a housing 5 and a terminal holder 4, wherein the housing 5 accommodates the terminals 2 therein and the terminal holder 4 is integrated with the housing 5.

Figure 4:
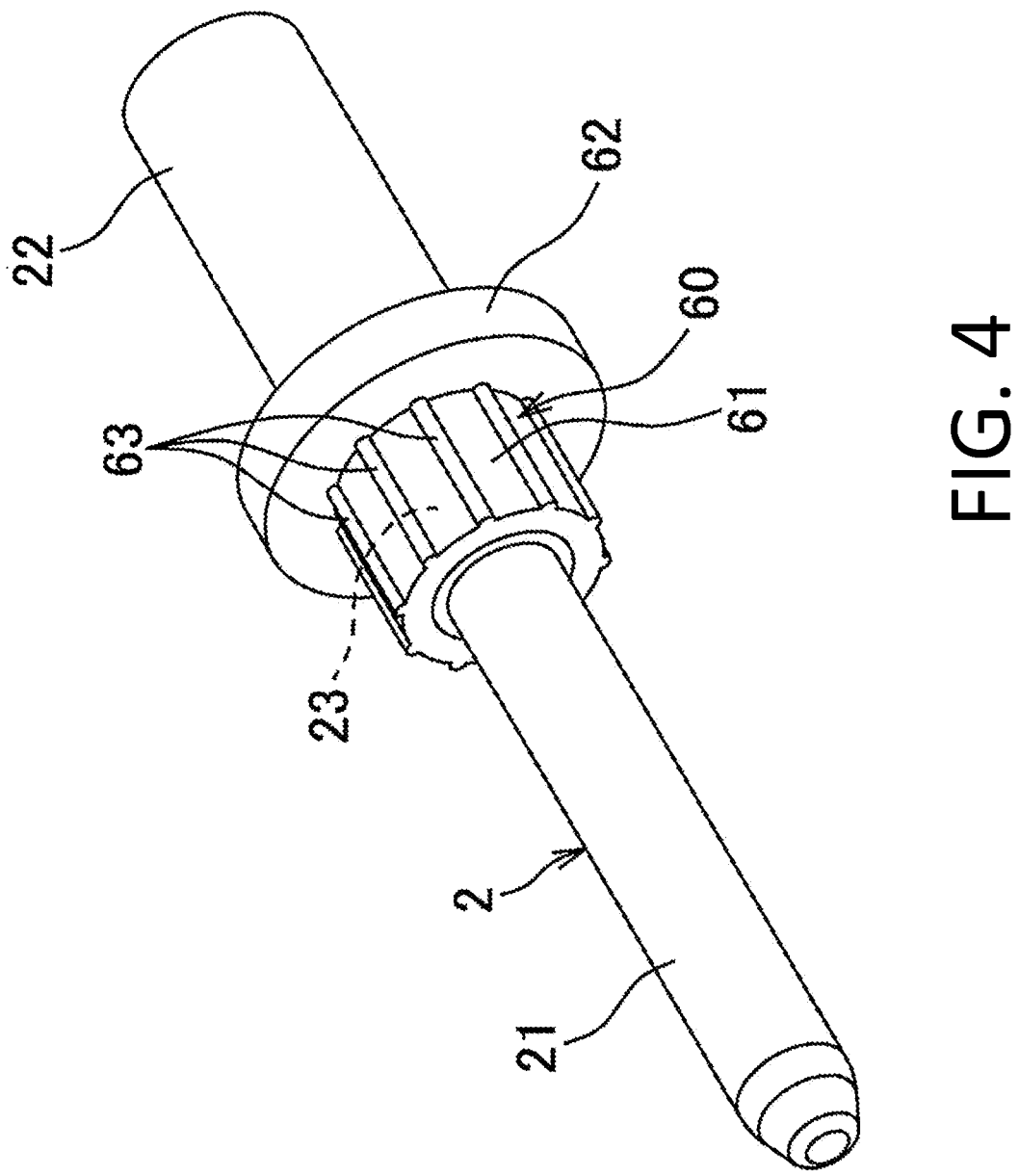
FIG. 4 shows a perspective view of a terminal, a rubber component and a flange according to FIG. 3.
Figure 5:
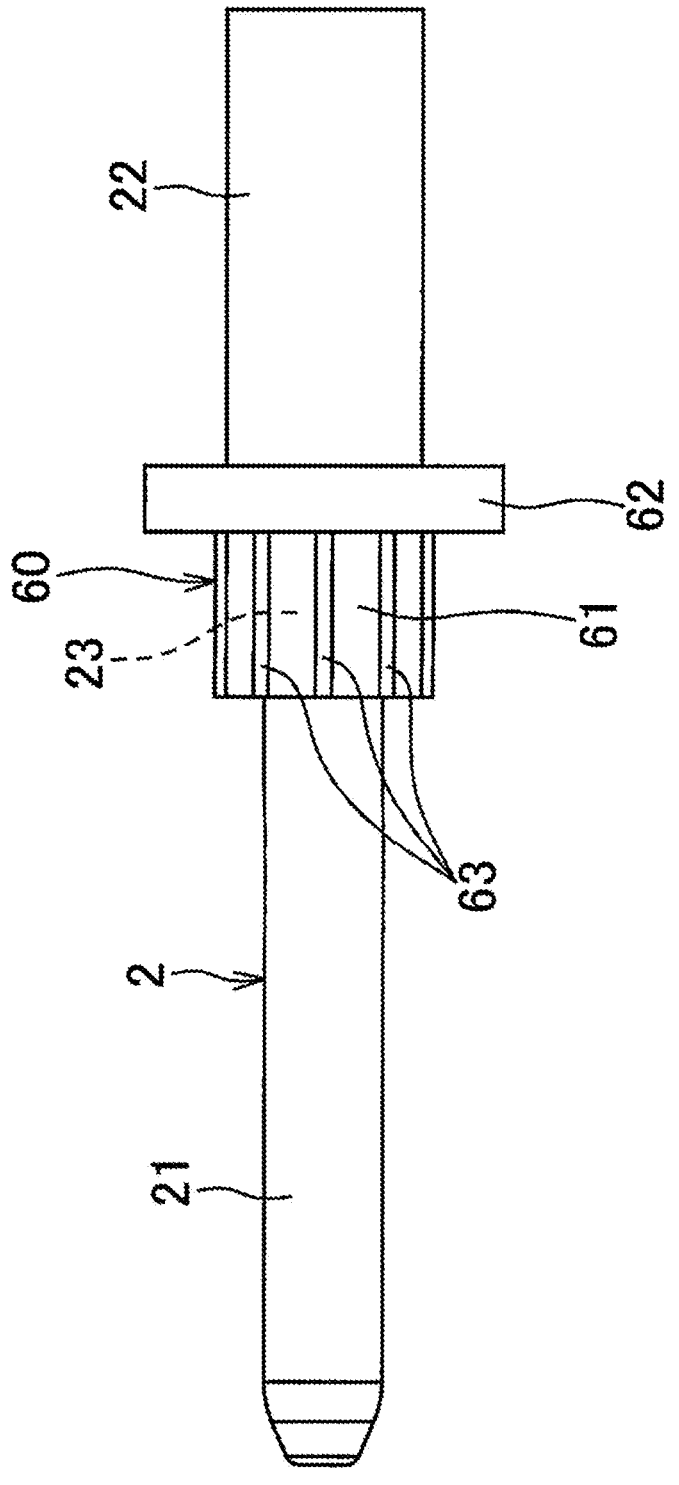
FIG. 5 shows a plan view of the terminal, rubber component and flange according to FIG. 4.

The terminals 2 are made of copper and shaped by means of cutting. As shown in FIGS. 2, 4 and 5, each of the terminals 2 includes a first connected portion 21 formed in a solid cylindrical shape, a second connected portion 22 disposed coaxially with the first connected portion 21, and a middle portion 23 between the first connected portion 21 and the second connected portion 22.

The first connected portion 21 is a portion intended to be mated with a terminal provided in the charging plug.

The second connected portion 22 is a portion electrically connected to an electric wire 3. The second connected portion 22 is formed in a cylindrical shape, wherein the second connected portion 22 includes a recess 24 with the electric wire 3 inserted therein. The recess 24 is open opposite to the first connected portion 21.

A ring-shaped concave groove 25 is formed in an outer circumference of the middle portion 23. Furthermore, a rubber component 60 and a flange 62 made of a resin are disposed on the outer circumference of the middle portion 23. The rubber component 60 and flange 62 are molded and integrated with the terminal 2 by means of insert molding in which the terminal 2 is placed in molds for producing the rubber component 60 and flange 62, respectively.

The rubber component 60 includes a cylindrical portion 61 and a plurality of ribs 63, wherein the ribs 63 are formed on an outer circumferential surface of the cylindrical portion 61 and extends along an axial direction of the cylindrical portion 61.

Figure 6:
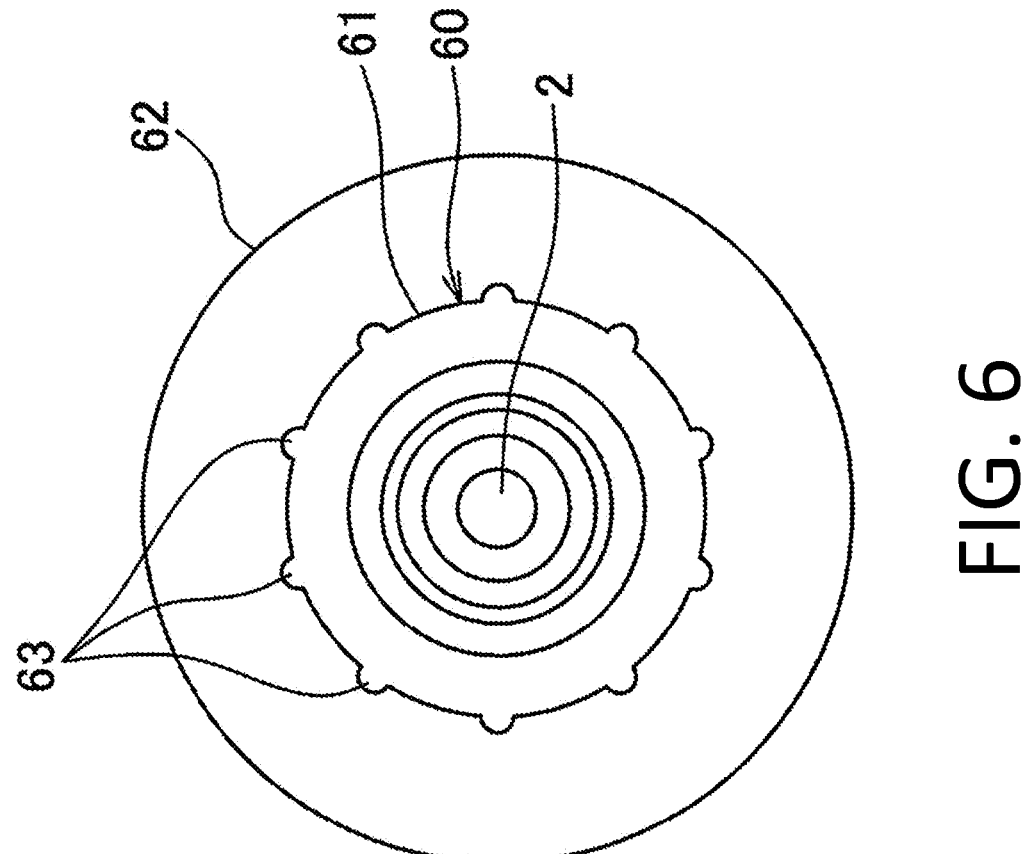
FIG. 6 shows a front view of the terminal, rubber component and flange according to FIG. 4.
Figure 7:
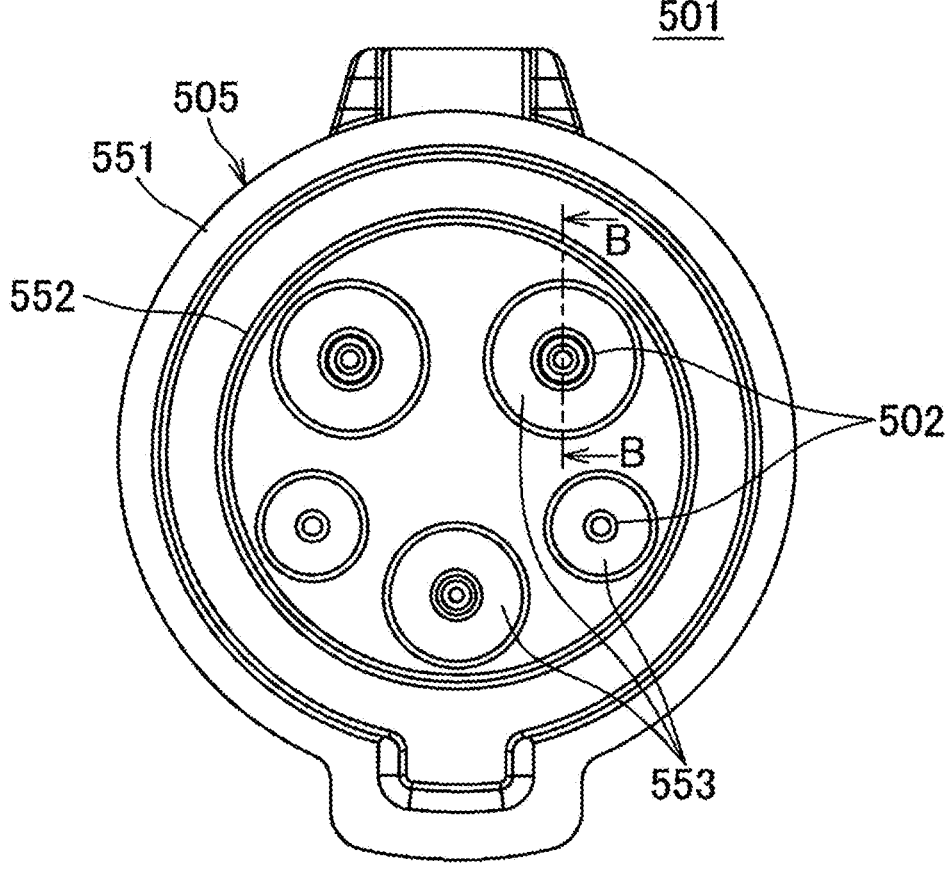
FIG. 7 shows a front view of a conventional charging inlet.
Figure 8:
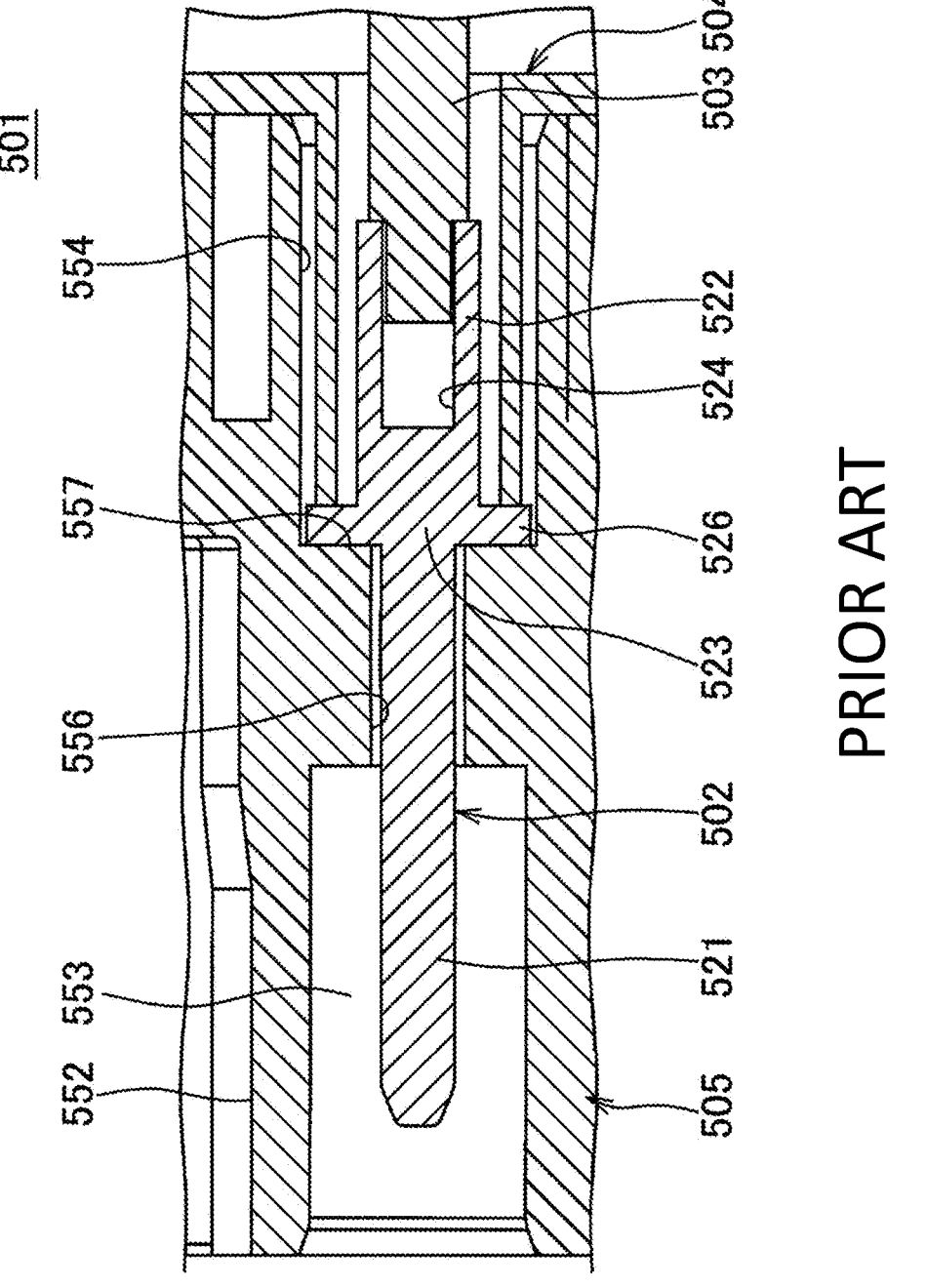
FIG. 8 shows a sectional view along the line B-B in FIG. 7.
Figure 9:
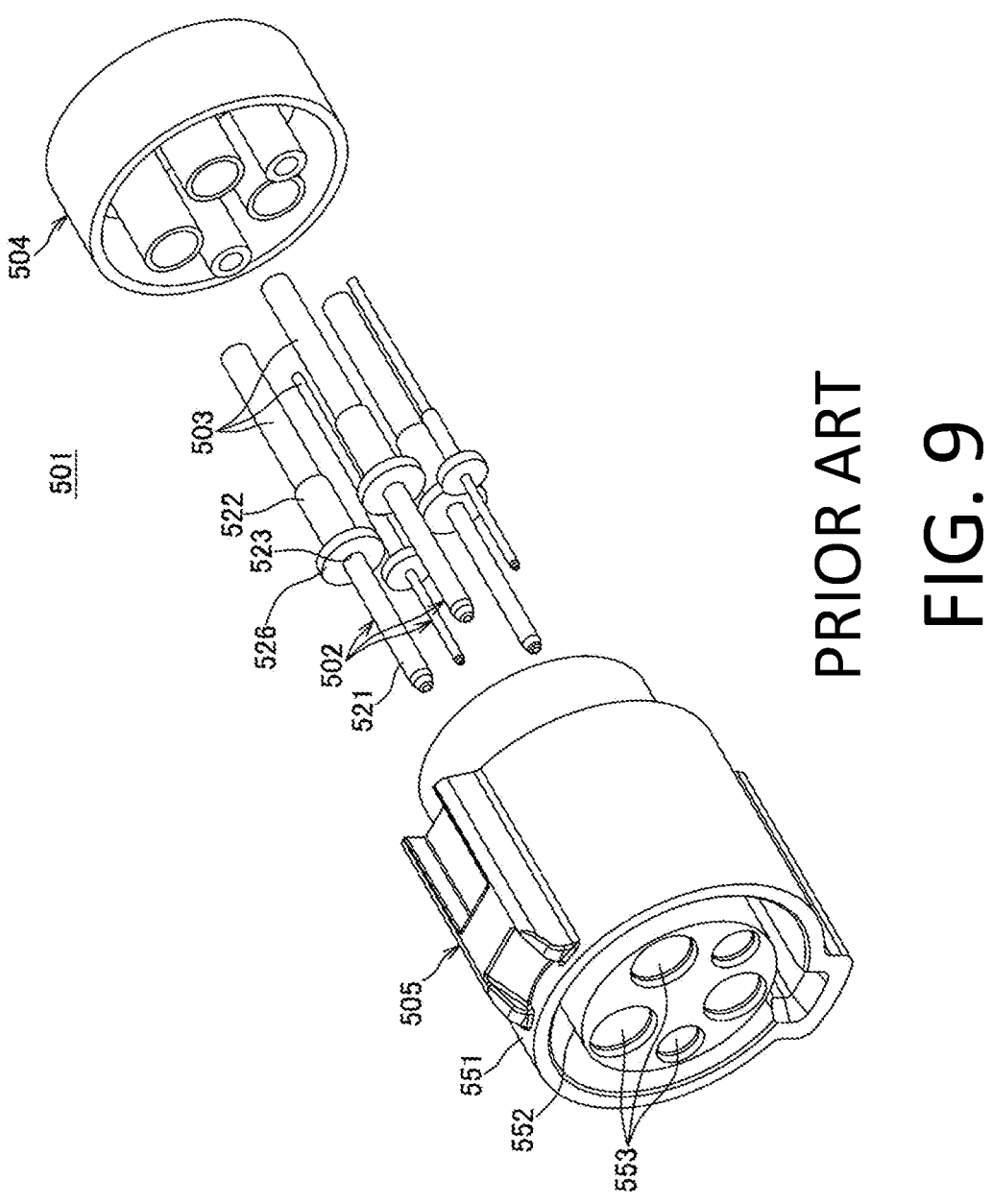
FIG. 9 shows an exploded view of the charging inlet according to FIG. 7.

The cylindrical portion 61 is disposed on a portion of the middle portion 23 which is closer to the first connected portion 21 than the ring-shaped concave groove 25. In this example, ten ribs 63 are formed, as shown in FIG. 6. These ribs 63 are arranged equidistantly on the outer circumferential surface of the cylindrical portion 61.

The flange 62 is disposed adjacent to an end of the cylindrical portion 61 facing the second connected portion 22 and is formed in a ring shape with a larger diameter than the cylindrical portion 61. Furthermore, the flange 62 is formed with a larger diameter than any portion of the terminal 2. The flange 62 is provided so as to fill the ring-shaped concave groove 25. An outer circumferential surface of the flange 62 is positioned outside the ring-shaped concave groove 25.

The housing 5 consists of an insulating synthetic resin. The housing 5 includes an inner housing 52 and a hood section 51 surrounding the inner housing 52, wherein the inner housing 52 accommodates the plurality of terminals 2 therein. For each of the terminals 2, the inner housing 52 includes a first accommodating portion 53, a second accommodating portion 54, a press-fit hole 55, and a communication portion 56 formed therein.

The first accommodating portion 53 is configured as a space which is open toward a front side of the charging inlet 1, wherein the first accommodating portion 53 accommodates a front half of the first connected portion 21.

The second accommodating portion 54 is configured as a space which is open toward a back side of the charging inlet 1, wherein the second accommodating portion 54 accommodates a back half of the middle portion 23, the flange 62 and second connected portion 22.

The press-fit hole 55 is configured as a space which is concave from a deepest side 57 of the second accommodating portion 54, wherein a front half of the middle portion 23 and rubber component 60 are press-fitted into the press-fit hole 55. The plurality of ribs 63 are crushed during being press-fitted into the press-fit hole 55.

The communication n portion 56 is a space through which the first accommodating portion 53 is in communication with the press-fit hole 55, wherein the communication portion 56 accommodates a back half of the first connected portion 21.

The terminal holder 4 includes an outer circumferential wall 41 having a cylindrical shape, holding portions 42 having a cylindrical shape and arranged inside the outer circumferential wall 41, and a connecting portion 43, wherein a holding portion 42 is provided for each of the terminals 2 and the connecting portion 43 connects each of the holding portions 42 to the outer circumferential wall 41.

The holding portions 42 are placed in the second accommodating portion 54, wherein the second connected portion 22 and an end of an electric wire 3 are positioned inside the second accommodating portion 54 by each of the holding portions 42. Each of the holding portions 42 prevents the terminal 2 from being removed out of the inner housing 52 by clamping the flange 26 between the holding portion 42 and the deepest side 57 of the second accommodating portion 54.

In this manner, the terminals 2 are held in the housing 5 without causing assembly instability in a radial direction as well as in a direction of the center axis. However, the terminals 2 are slightly displaceable in the radial direction by elastically deforming the rubber component 60. This enables a radial position of the terminal 2 to be adjusted inside the inner housing 52 depending on terminal misalignment of the charging plug, which allows electric transmission stability to be achieved.

The charging inlet 1 is produced by successively applying a terminal shaping step, a rubber component molding step, a flange molding step, a plating step, a connecting step of connecting the second connected portion 22 to the electric wire 3, a terminal integrating step, and a terminal holder integrating step.

Figure 10:
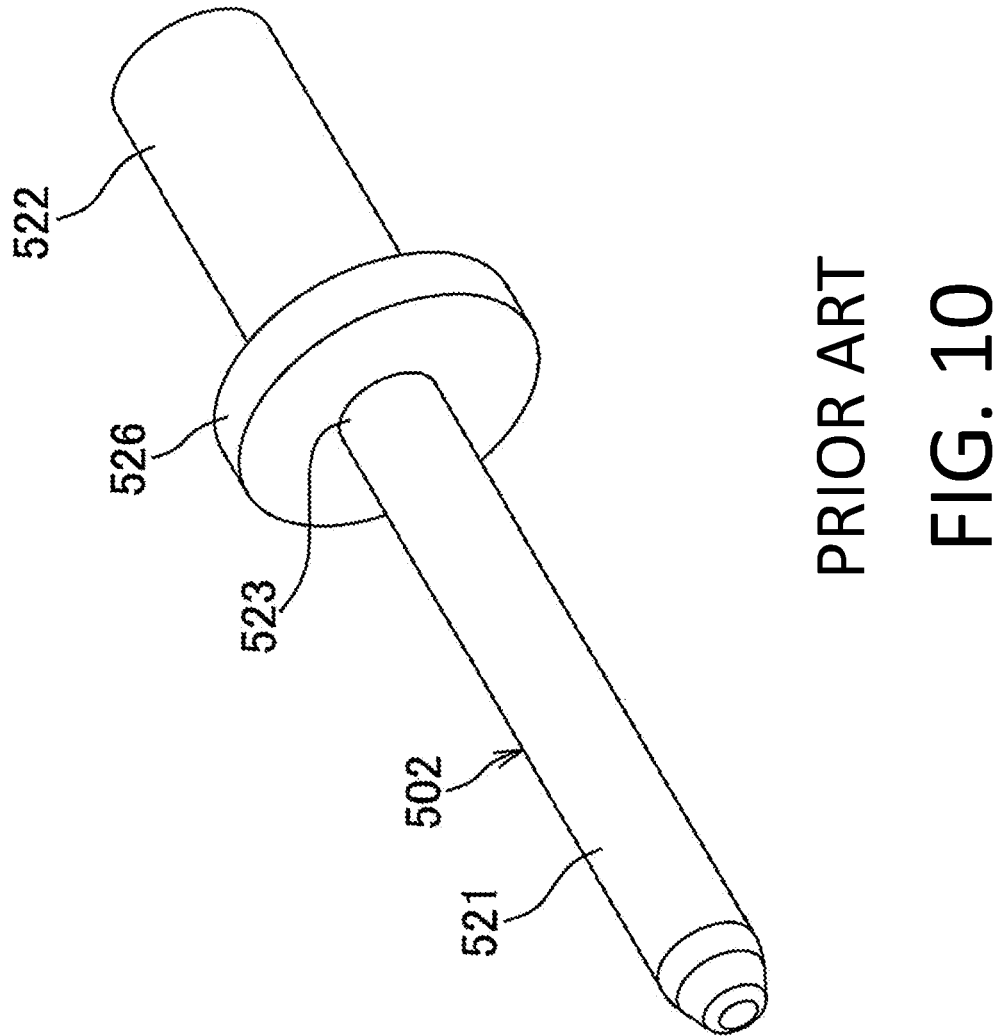
FIG. 10 shows a perspective view of a terminal according to FIG. 9.

In the terminal shaping step, the terminal 2 are shaped by means of cutting. Conventionally, a terminal 502 (see FIG. 10) is shaped by being cut out of a base material adapted to a diameter of a flange 526, which causes a large amount of waste of material during cutting. In this regard, the present example enables the terminal 2 to be processed by using a minimum diameter of base material as required so that it is possible to reduce an amount of waste of copper material and thus the costs.

In the rubber component molding step, the rubber component 60 is molded by means of insert molding in which the terminal 2 is placed in a mold for producing the rubber component 60. In this rubber component molding step, the rubber component 60 is integrated with the terminal 2.

In the flange molding step, the flange 62 is molded by means of insert molding in which the terminal 2 is placed in a mold for producing the flange 62. In this flange molding step, the flange 62 is integrated with the rubber component 60 and terminal 2. As describe above, a portion of the flange 62 enters the ring-shaped concave groove 25, which makes it difficult to remove (detach) the rubber component 60 and flange 62 from the terminal 2.

In the plating step, an exposed outer surface of the terminal 2 is plated except for portions of the terminal 2 with the rubber component 60 and flange 62 disposed thereon. Conventionally, the terminal 502 (see FIG. 10) is also plated on the flanges 526 which does not need to be plated, which causes a large amount of plating material used. In this regard, the terminal 2 according to the present example is plated only on a portion which needs to be plated, whereby a reduced amount of plating material is used and the costs can be thus reduced.

In the terminal integrating step, the terminals 2 integrated with the rubber components 60 and flanges 62 are press-fitted into the inner housing 52. As described above, the ribs 63 are crushed during press-fitting to hold the terminals 2 in the housing 5 without causing assembly instability of the terminals 2 in the radial direction.

It is to be noted that the embodiments as described above merely illustrate representative examples for the present invention, and the present invention is not limited to these embodiments. I.e., various modifications may be performed without departing from the core of the present invention. It is obvious that such modifications are included in the scope of the present invention as far as the modifications comprise the features of the present invention.

REFERENCE SIGNS LIST

1 Charging inlet
2 Terminals
1 Terminal holder
5 Housing
21 First connected portion
22 Second connected portion
23 Middle portion
60 Rubber component
61 Cylindrical portion
62 Flange
63 Ribs

What is claimed is:

1. A charging inlet comprising:
a terminal;
a housing accommodating the terminal therein; and
a terminal holder integrated to the housing,
wherein the terminal includes:
    a first connected portion having a solid cylindrical shape and configured for connection of a partner terminal thereto, the partner terminal being included in a charging plug;
    a second connected portion disposed coaxially with the first connected portion and configured for electrical connection of an electric wire thereto; and
    a middle portion between the first connected portion and the second connected portion,
wherein a rubber component and a flange made of a resin are disposed on an outer circumference of the middle portion, wherein the rubber component includes:
    a cylindrical portion; and
    a plurality of ribs on an outer circumferential surface of the cylindrical portion, the ribs extending along an axial direction of the cylindrical portion,
wherein the flange is disposed adjacent to an end of the cylindrical portion facing the second connected portion and has a ring shape with a larger diameter than the cylindrical portion,
wherein the housing has a press-fit hole in which the rubber component is press-fitted, and
wherein the flange is clamped between the housing and the terminal holder outside the press-fit hole.

2. The charging inlet according to claim 1,
wherein the flange has a larger diameter than any portion of the terminal.

3. A method of producing the charging inlet according to claim 1, successively comprising:
a terminal shaping step of shaping the terminal by means of cutting;
a rubber component molding step of molding the rubber component by means of insert molding in which the terminal is placed in a mold for producing the rubber component;
a flange molding step of molding the flange by means of insert molding in which the terminal is placed in a mold for producing the flange; and
a plating step of plating an exposed outer surface of the terminal except for portions of the terminal with the rubber component and the flange disposed thereon.

4. A method of producing the charging inlet according to claim 2, successively comprising:
a terminal shaping step of shaping the terminal by means of cutting;
a rubber component molding step of molding the rubber component by means of insert molding in which the terminal is placed in a mold for producing the rubber component;
a flange molding step of molding the flange by means of insert molding in which the terminal is placed in a mold for producing the flange; and
a plating step of plating an exposed outer surface of the terminal except for portions of the terminal with the rubber component and the flange disposed thereon.

5. The charging inlet according to claim 1, further comprising the electric wire electrically connected to the second connected portion.

6. The charging inlet according to claim 1,
wherein the second connected portion includes a recess configured for insertion of the electric wire therein.

7. The charging inlet according to claim 6,
wherein the recess is open on a side of the second connected portion opposite to the first connected portion.

8. The charging inlet according to claim 1,
wherein the flange is received in a ring-shaped concave groove in the outer circumference in the middle portion.

9. The charging inlet according to claim 1,
wherein the terminal is made of copper.

* * * * *